United States Patent
Tsaur et al.

(10) Patent No.: US 11,137,931 B1
(45) Date of Patent: Oct. 5, 2021

(54) BACKUP METADATA DELETION BASED ON BACKUP DATA DELETION

(71) Applicant: EMC Corporation, Hopkinton, MA (US)

(72) Inventors: Ynn-Pyng Tsaur, Cupertino, CA (US); Venu Varma, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 19 days.

(21) Appl. No.: 15/200,363

(22) Filed: Jul. 1, 2016

(51) Int. Cl.
*G06F 3/06* (2006.01)

(52) U.S. Cl.
CPC ............ *G06F 3/0652* (2013.01); *G06F 3/064* (2013.01); *G06F 3/065* (2013.01); *G06F 3/0608* (2013.01); *G06F 3/0619* (2013.01); *G06F 3/0683* (2013.01)

(58) Field of Classification Search
CPC .... G06F 3/0652; G06F 3/0608; G06F 3/0619; G06F 3/064; G06F 3/065; G06F 3/0683; G06F 11/1448; G06F 11/1451; G06F 11/1458
See application file for complete search history.

(56) References Cited

U.S. PATENT DOCUMENTS

| | | | | |
|---|---|---|---|---|
| 7,774,315 B1 * | 8/2010 | Galker | ................ | G06F 11/1456 707/644 |
| 8,621,166 B1 * | 12/2013 | Chatterjee | ........... | G06F 11/1435 711/162 |
| 9,152,504 B1 * | 10/2015 | Bushman | ............ | G06F 11/1451 |
| 9,274,907 B1 * | 3/2016 | Bachu | ................. | G06F 11/1448 |
| 2001/0056425 A1 * | 12/2001 | Richard | ............. | G06F 11/1458 |
| 2007/0136381 A1 * | 6/2007 | Cannon | ............... | G06F 11/1451 |
| 2007/0239949 A1 * | 10/2007 | Childs | ................. | G06F 11/1464 711/162 |
| 2010/0070764 A1 * | 3/2010 | Ishii | ..................... | G06F 11/1453 713/168 |
| 2012/0078845 A1 * | 3/2012 | Kasbekar | ............. | G06Q 10/107 707/640 |
| 2013/0110783 A1 * | 5/2013 | Wertheimer | ............ | G06F 11/14 707/646 |
| 2013/0346713 A1 * | 12/2013 | Beeken | ............... | G06F 11/1448 711/162 |
| 2014/0181033 A1 * | 6/2014 | Pawar | ................. | G06F 11/1474 707/644 |
| 2015/0242417 A1 * | 8/2015 | Spurlock | ............ | G06F 16/2228 707/694 |
| 2015/0317339 A1 * | 11/2015 | Vranyes | ................. | G06Q 10/00 707/695 |
| 2016/0314048 A1 * | 10/2016 | Liu | ..................... | G06F 11/1461 |

* cited by examiner

*Primary Examiner* — Sanjiv Shah
*Assistant Examiner* — Alexander J Yoon
(74) *Attorney, Agent, or Firm* — Dergosits & Noah LLP; Todd A. Noah

(57) ABSTRACT

Backup metadata deletion based on backup data deletion is described. A system receives a request to delete a backup data set associated with a host, a path, and a backup time. The system identifies a backup metadata object associated with the host and the path. The system determines whether the requested backup time is the earliest backup time associated with any backup data set associated with the host. The system determines whether the identified backup metadata object is a backup metadata deletion object associated with the backup time if the backup time is the earliest backup time. The system deletes the identified backup metadata object if the identified backup metadata object is a backup metadata deletion object associated with the backup time.

20 Claims, 3 Drawing Sheets

BACKUP METADATA DELETION BASED ON BACKUP DATA DELETION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. A backup/restore application may create a full backup file that includes all of a data object or the parts of the data object that are used. A backup/restore application may also create an incremental backup file that includes only changes made to the data object since a selected time, such as a previous backup of the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
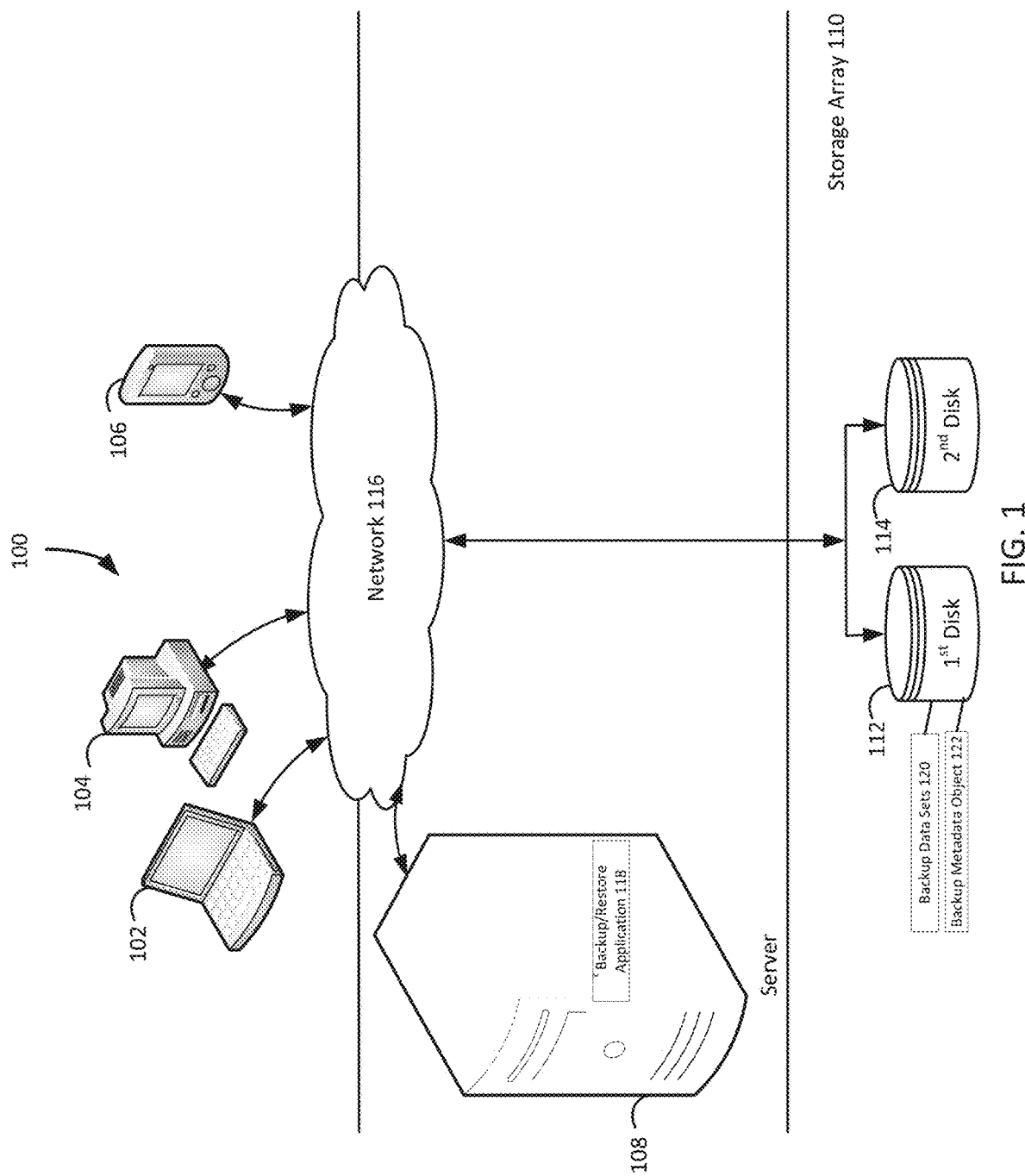
FIG. 1 illustrates a block diagram of an example system for backup metadata deletion based on backup data deletion, under an embodiment.

A backup/restore application can create a full backup file for all of a data object or create an incremental backup file for only changes made to the data object since a selected time, such as a previous backup of the data object. Some backup/restore applications create backup files for the data of a data object via a typical backup workflow, and create backup files for the metadata of the data object outside the typical backup workflow. The backup files for the data may be referred to as backup data sets, while the backup files for the metadata may be referred to as backup metadata objects. For example, a backup/restore application creates a full backup file for the data in a document database at noon on June $1^{st}$, creates an incremental backup file for the changed data in the document database at noon on June $2^{nd}$, creates another incremental backup file for the changed data in the document database at noon on June $3^{rd}$, and continues creating such backup data sets at noon on each day. Continuing this example, the backup/restore application (or a separate backup/restore application) creates a full backup file for the metadata in the document database at noon on June $1^{st}$, creates an incremental backup file for the changed metadata in the document database when the metadata changes at 1:13 P.M. on June $1^{st}$, creates another incremental backup file for the changed metadata in the document database when the metadata changes at 2:17 P.M. on June $1^{st}$, and continues creating such backup metadata objects whenever the metadata changes. The backup/restore application subsequently establishes the associations between the backup data sets and the backup metadata objects during restore, browsing, and search operations. One type of backup metadata object is a backup metadata deletion object that identifies data and/or metadata that has been deleted since the last time that a backup metadata object was created. A backup metadata deletion object is used to create a current view of the data and/or metadata in the data object and to determine the data and/or metadata that needs to be removed from a backup catalog at the deletion of a backup data set.

A backup metadata object needs to be stored only as long as its associated backup data set is stored. When a backup data set is deleted, the associated backup metadata objects need to be deleted to avoid potential confusion and to conserve storage space. The process of deleting backup metadata objects needs to maintain the integrity and relationships between the full and incremental backup files for the metadata in a data object. A typical process for maintaining the metadata integrity and relationships is to store a listing of all metadata in each changed folder and each changed folder's parent folder since the last incremental backup file was created. When a backup data set created at a specified time is subsequently deleted, the backup metadata objects created at the specified time are deleted if the backup metadata objects created at times subsequent to the specified time do not depend on the backup metadata objects created at the specified time. However, calculating this metadata dependency consumes a significant amount of resources and is error prone. Furthermore, storing a listing of all metadata in each changed folder and each changed folder's parent folder since the last incremental backup file was created requires significant storage space, even when only a small amount of metadata in a folder is changed. Consequently, multiple full backup files must be maintained for the metadata in a data object to insure the integrity of dependency relationships and to reduce the resource consumption required to calculate the dependency relationships. However, maintaining multiple full backup files for the metadata in a data object requires a significant amount of resources, such as storage space.

Embodiments herein enable backup metadata deletion based on backup data deletion. A system receives a request to delete a backup data set specified by a host, a path, and a backup time. The system identifies a backup metadata object associated with the specified host and the specified path. The system determines whether the specified backup time is the earliest backup time associated with any backup data set associated with the specified host. The system determines whether the identified backup metadata object is a backup metadata deletion object associated with the specified backup time if the specified backup time is the earliest backup time. The system deletes the identified backup metadata object if the identified backup metadata object is a backup metadata deletion object associated with the specified backup time.

For example, a backup/restore application receives a request to delete a backup data set created on June $2^{nd}$ at noon for a desktop computer's path c:\Users\Joe\abc.doc. The backup/restore application identifies all backup metadata objects for the desktop computer's parent path c:\Users\Joe. If any of the backup metadata objects for the desktop computer's parent path c:\Users\Joe is a backup metadata deletion object that was created on June $2^{nd}$ at noon, and if the backup time of June $2^{nd}$ at noon is the earliest backup time of any backup data set created for the desktop computer, then the backup/restore application deletes each backup metadata deletion object for the desktop computer's parent path c:\Users\Joe that was created on June $2^{nd}$ at noon.

In contrast to a typical process for maintaining the metadata integrity and relationships, the backup/restore application stores only the metadata objects that have been added, modified, or deleted since the creation of the most recent backup metadata object. The storage space required for the metadata can be reduced when the backup/restore application eliminates any need to store a listing of all metadata in each changed folder and each changed folder's parent folder since the last incremental backup file. Furthermore, the backup/restore application's management of the backup metadata deletion objects simplifies computations by eliminating any need to calculate a metadata dependency chain when a corresponding backup data set expires.

FIG. 1 illustrates a diagram of a system for backup metadata deletion based on backup data deletion, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop computer 102, the second client 104 as a personal computer 104, and the third client 106 as a personal digital assistant 106, each of the clients 102-106 may be any type of computer, such as a server. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 300 depicted in FIG. 3 and described below.

The server 108, which may be referred to as a backup server 108, includes a backup/restore application 118 that creates backup files of the data and the metadata of the clients 102-106, stores the backup files as backup data sets 120 and backup metadata objects 122 on the first disk 112 and/or the second disk 114, and executes a rollback based on the backup files. The backup/restore application 118 may provide centralized administration, such as scheduling, monitoring, and managing backup operations and backup files. The backup/restore application 118 can enable the storing of backup operation schedules, client policies, and client configurations. The backup/restore application 118 maintains a local database of all processes that execute on the server 108. The backup/restore application 118 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 118 residing completely on the backup server 108, the backup/restore application 118 may reside in any combination of partially on the backup server 108, partially on the clients 102-106, and/or partially elsewhere. Even though the following paragraphs describe EMC Corporation's Alamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 118 receives a request to delete a backup data set specified by a host name, a path name, and a backup time. For example, the backup/restore application 118 receives a request from the desktop computer 104 to delete a backup data set created on June $2^{nd}$ at noon for the desktop computer's path c:\Users\Joe\abc.doc. Although this example describes the backup/restore application 118 receives an external request to delete a backup data set, the backup/restore application 118 may receive an internal request to delete a backup data set, such as when the backup/restore application 118 includes an internal component that monitors the backup data sets and requests deletions of expired backup data sets. Having received the request to delete the backup data set specified by the host name, the path name, and the backup time, the backup/restore application 118 identifies a backup metadata object associated with the specified host and the specified path. For example, the backup/restore application 118 identifies all backup metadata objects for the desktop computer's parent path c:\Users\Joe. After identifying the backup metadata objects that match the specified host and the specified path, the backup/restore application 118 sorts the identified backup metadata objects by their corresponding creation times, which are compared to the specified backup time. Three different scenarios exist for handing deletion of backup metadata objects: when the specified backup time is the earliest backup time of any backup set for the specified host, when the specified backup time is the most recent backup time of any backup set for the specified host, and when the specified backup time is the between the earliest backup time of any backup set for the specified host and the most recent backup time of any backup set for the specified host. Each of these three different scenarios results in a different handing of deletion of backup metadata objects.

When the scenario is based on the deletion of the earliest backup data set, the backup/restore application 118 only deletes metadata deletion objects created at the time when the earliest backup data set was created. Having received the request to delete the backup data set associated with the host name, the path name, and the backup time, the backup/restore application 118 determines whether the specified backup time is the earliest backup time of any backup data set created for the specified host. For example, the backup/restore application 118 determines whether the backup time of June $2^{nd}$ at noon is the earliest backup time of any backup data set created for the desktop computer 104. If the specified backup time is the earliest backup time of any backup data set created for the specified host, the backup/restore application 118 determines whether an identified backup metadata object is a backup metadata deletion object created at the specified backup time. For example, the backup/restore application 118 determines whether any of the backup metadata objects for the desktop computer's parent path c:\Users\Joe is a backup metadata deletion object that was created on June $2^{nd}$ at noon if the backup time of June $2^{nd}$ at noon is the earliest backup time of any backup data set for the desktop computer 104. If an identified backup metadata object is a backup metadata deletion object created at the specified backup time, the backup/restore application 118 deletes the identified backup metadata object. For example, the backup/restore application 118 marks the backup data set for the desktop computer's parent path c:\Users\Joe\abc.doc that was created on June $2^{nd}$ at noon as deleted, deletes each backup metadata deletion object for the desktop computer's parent path c:\Users\Joe that was created on June $2^{nd}$ at noon, and deletes the backup data set for the desktop computer's parent path c:\Users\Joe\abc.doc that was created on June $2^{nd}$ at noon and was marked as deleted. The backup/restore application 118 deletes each backup metadata deletion object created at the specified backup time because such a backup metadata deletion object identifies data and/or metadata that has already been deleted from all subsequent backup files, such that retention of such a metadata deletion object is not only unnecessary, but would be wasteful of storage space. In this scenario, the backup/restore application 118 does not delete backup metadata objects that are not backup metadata deletion objects created at the specified backup time because such backup metadata objects may be the basis for restoring, browsing, and/or searching subsequently created backup metadata objects When the scenario is based on the deletion of the most recent backup data set, the backup/restore application 118 deletes all metadata deletion objects created after the time when the most recent backup data set was created. If the specified backup time backup time is not the earliest backup time of any backup data set created for the specified host, the backup/restore application 118 can determine whether the specified backup time is the most recent backup time of any backup data set created for the specified host. For example, the backup/restore application 118 determines whether the backup time of June $2^{nd}$ at noon is the most recent backup time of any backup data set created for the desktop computer 104. If the specified backup time is the most recent backup time of any backup data set created for the specified host, the backup/restore application 118 can determine whether an identified backup metadata object was created at a time that is the specified backup time or is later than the specified backup time. For example, the backup/restore application 118 identifies all backup metadata objects for the desktop computer's parent path c:\Users\Joe that were created after noon on June $2^{nd}$. If an identified backup metadata object was created at a time that is the specified backup time or is later than the specified backup time, the backup/restore application 118 can delete the identified backup metadata object. For example, the backup/restore application 118 marks the backup data set for the desktop computer's parent path c:\Users\Joe\abc.doc that was created on June $2^{nd}$ at noon as deleted, deletes all backup metadata objects for the desktop computer's parent path c:\Users\Joe that were created after noon on June $2^{nd}$, and deletes the backup data set for the desktop computer's parent path c:\Users\Joe\abc.doc that was created on June $2^{nd}$ at noon and was marked as deleted. In this scenario, the backup/restore application 118 may delete the backup data set that was marked as deleted, or only mark the backup data set as deleted but bypass the current deletion of the backup data set that is marked as deleted. The backup/restore application 118 may bypass the current deletion of the backup data set that was marked as deleted because a new backup data set may be in the process of being created during the deletion of the backup data set that was marked as deleted, which can result in inconsistencies. In the scenario based on the deletion of the most recent backup data set, the backup/restore application 118 deletes all metadata deletion objects created after the time when the most recent backup data set was created because no existing backup data set will be associated with the metadata deletion objects that were created after the time when the most recent backup data set was created.

When the scenario is based on the deletion of a backup data set that was created after the earliest backup data set but before the most recent backup data set, the backup/restore application 118 deletes specific metadata deletion objects created at times that are before the specified backup data set but after a time that the immediately preceding backup data set was created. If the specified backup time is not the most recent backup time of any backup data set created for the specified host, nor the earliest backup time of any backup data set created for the specified host, the backup/restore application 118 can identify the specified host's immediately preceding backup time and the specified host's immediately following backup time. For example, the backup/restore application 118 identifies that the immediately preceding backup data set that was created for the desktop computer 104 prior to noon on June $2^{nd}$ was created at noon on June $1^{st}$, and the immediately following backup data set that was created for the desktop computer 104 after noon on June $2^{nd}$ was created at noon on June $3^{rd}$. After identifying the specified host's immediately preceding backup time and the specified host's immediately following backup time, the backup/restore application 118 can determine whether an identified backup metadata object is a backup metadata deletion object that was created at a time that is later than the specified backup time and that is the host's immediately following backup time or is earlier than the host's immediately following backup time. For example, the backup/restore application 118 determines whether the backup metadata objects for the desktop computer's parent path c:\Users\Joe that are backup metadata deletion objects were created after noon on June $2^{nd}$ but before or by noon on June $3^{rd}$. If an identified backup metadata object is a backup metadata deletion object that was created at a time that is later than the specified backup time and that is the specified host's immediately following backup time or is earlier than the specified host's immediately following time, the backup/restore application 118 can determine whether the identified backup metadata object includes directory deletion metadata. For example, the backup/restore application 118 determines whether backup metadata objects created between the specified times for the desktop computer's parent path c:\Users\Joe include directory deletion metadata.

If an identified backup metadata object created between the specified times does not include directory deletion metadata, the backup/restore application 118 can delete backup metadata objects associated with the backup metadata object and a creation time that is later than the specified host's immediately preceding backup time and that is the specified backup time or is earlier than the specified backup time. For example, the backup/restore application 118 marks the backup data set for the desktop computer's parent path c:\Users\Joe\abc.doc that was created on June $2^{nd}$ at noon as deleted, deletes all backup metadata objects that were created after noon on June $1^{st}$ but before or by noon on June $2^{nd}$, and that are identified as deleted by the backup metadata deletion object for the desktop computer's parent path c:\Users\Joe, and deletes the backup data set for the desktop computer's parent path c:\Users\Joe\abc.doc that was created on June $2^{nd}$ at noon and was marked as deleted. In this scenario, the backup/restore application 118 deletes backup metadata objects that were created prior to the specified backup time and that are identified as subsequently deleted by a backup metadata deletion object that was created after the specified backup time. These backup metadata objects are no longer retained due to the impending deletion of their corresponding backup data set.

If an identified backup metadata object created between the specified times includes directory deletion metadata, the backup/restore application 118 can delete backup metadata children objects associated with the identified backup metadata object and that were created at a time that is later than the specified host's immediately preceding backup time and that is the specified backup time or is earlier than the specified backup time. For example, the backup/restore application 118 marks the backup data set for the desktop computer's parent path c:\Users\Joe\abc.doc that was created on June $2^{nd}$ at noon as deleted, deletes all backup metadata objects for the desktop computer's parent path c:\Users\Joe that were created after noon on June $1^{st}$ but before or by noon on June $2^{nd}$, and that are children objects of a backup metadata object for the desktop computer's parent path c:\Users\Joe that was created at noon on June $2^{nd}$ and that includes directory deletion metadata, and deletes the backup data set for the desktop computer's parent path c:\Users\Joe\abc.doc that was created on June $2^{nd}$ at noon and was marked as deleted. In this scenario, the backup/restore application 118 deletes backup metadata objects that were created prior to the specified backup time and that are identified as children objects in a directory that is identified as subsequently deleted by a backup metadata deletion object that was created after the specified backup time. These backup metadata directory children objects are no longer retained due to the subsequent deletion of their corresponding directory and the impending deletion of their corresponding backup data set.

In addition to deleting any backup metadata children objects associated with the backup metadata object and a time that is later than the immediately preceding backup time and that is the specified backup time or is earlier than the specified backup time, the backup/restore application 118 can delete the backup metadata object if the backup metadata object was created at the specified backup time. For example, the backup/restore application 118 deletes the backup metadata object for the desktop computer's parent path c:\Users\Joe that was created at noon on June $2^{nd}$ and that includes directory deletion metadata. In this scenario, the backup/restore application 118 deletes the backup metadata object that includes directory deletion metadata and that was created at the specified backup time. This backup metadata object is no longer retained due to the deletion of its corresponding directory children objects and the impending deletion of its corresponding backup data set.

In contrast to a typical process for maintaining the metadata integrity and relationships, the backup/restore application 118 stores only the metadata objects that have been added, modified, or deleted since the creation of the most recent backup metadata object. The storage space required for the metadata can be reduced when the backup/restore application 118 eliminates any need to store a listing of all metadata in each changes folder and each changes folder's parent folder since the last incremental backup file. Furthermore, the backup/restore application 118's management of the backup metadata deletion objects simplifies computations by eliminating any need to calculate a metadata dependency chain when a corresponding backup data set expires.

Figure 2:
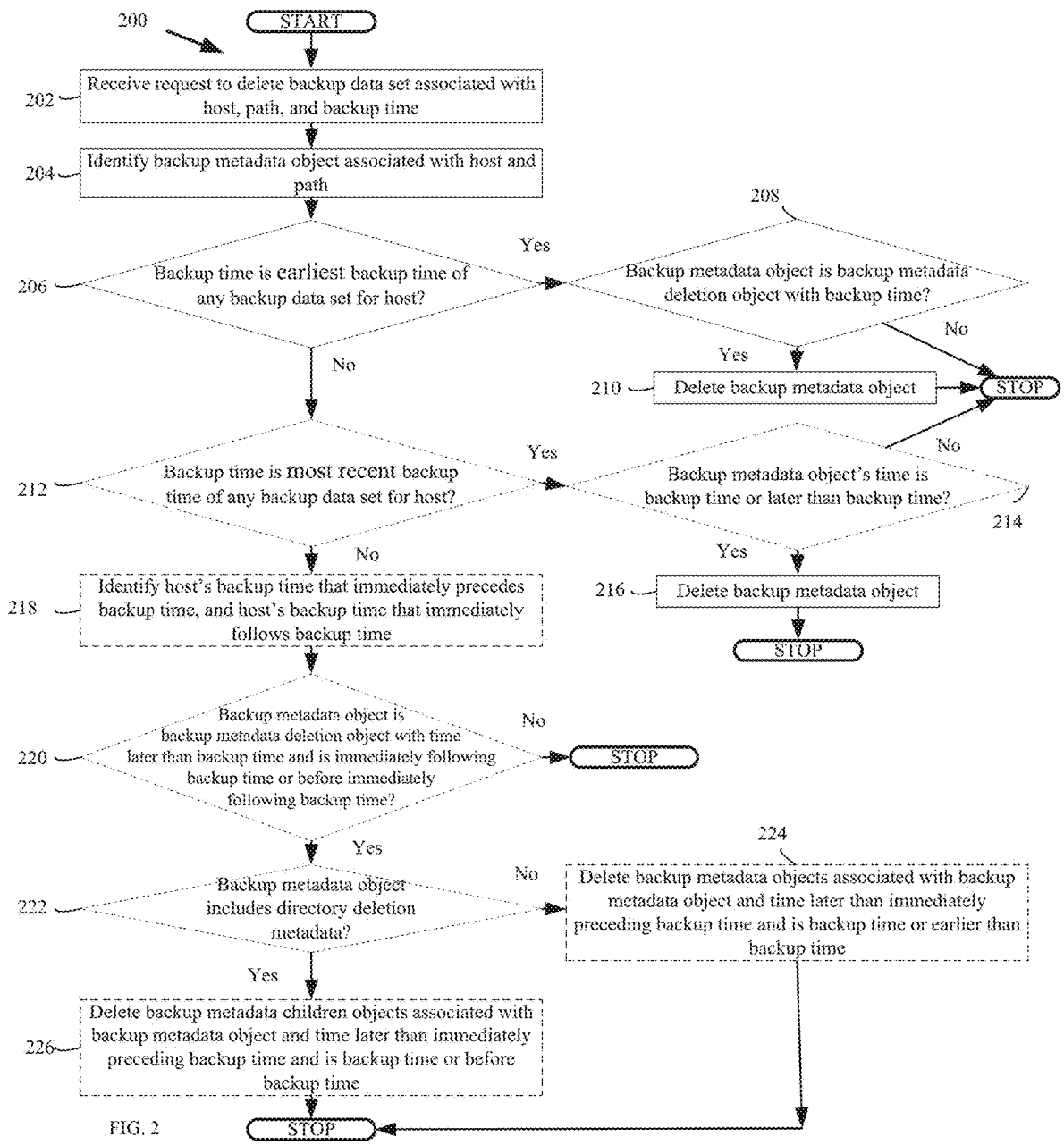
FIG. 2 is a flowchart that illustrates a method of backup metadata deletion based on backup data deletion, under an embodiment.

FIG. 2 is a flowchart that illustrates a method for backup metadata deletion based on backup data deletion, under an embodiment. Flowchart 200 illustrates method acts illustrated as flowchart blocks for certain steps involved in and/or between the clients 102-106 and/or the server 108 of FIG. 1.

A system receives a request to delete a backup data set specified by a host name, a path name, and a backup time, block 202. For example, the backup/restore application 118 receives a request from the desktop computer 104 to delete a backup data set created on June $2^{nd}$ at noon for the desktop computer's path c:\Users\Joe\abc.doc.

Having received a request to delete a backup data set specified by a host name, a path name, and a backup time, a system identifies a backup metadata object associated with the specified host and the specified path, block 204. For example, the backup/restore application 118 identifies all backup metadata objects for the desktop computer's parent path c:\Users\Joe.

Having received a request to delete a backup data set associated with a host name, a path name, and a backup time, a system determines whether the specified backup time is the earliest backup time of any backup data set created for the specified host, block 206. For example, the backup/restore application 118 determines whether the backup time of June $2^{nd}$ at noon is the earliest backup time of any backup data set created for the desktop computer 104. If the specified backup time is the earliest backup time of any backup data set created for the specified host, the flowchart 200 continues to block 208 to determine if the backup metadata object is a backup metadata deletion object associated with the specified backup time. If the specified backup time is not the earliest backup time of any backup data set created for the specified host, the flowchart 200 proceeds to block 212 to determine if the specified backup time is the most recent backup time of any backup data set created for the specified host.

If a specified backup time is the earliest backup time of any backup data set created for a specified host, a system determines whether an identified backup metadata object is a backup metadata deletion object created at the specified backup time, block 208. For example, the backup/restore application 118 determines whether any of the backup metadata objects for the desktop computer's parent path c:\Users\Joe is a backup metadata deletion object that was created on June $2^{nd}$ at noon if the backup time of June $2^{nd}$ at noon is the earliest backup time of any backup data set for the desktop computer 104. If the identified backup metadata object is a backup metadata deletion object created at the specified backup time, the flowchart 200 continues to block 210 to delete the identified backup metadata object. If the identified backup metadata object is not a backup metadata deletion object created at the specified backup time, the flowchart 200 terminates for the identified backup metadata object created at the specified backup time.

If an identified backup metadata object is a backup metadata deletion object created at a specified backup time, a system deletes the identified backup metadata object, block 210. For example, the backup/restore application 118 deletes each backup metadata deletion object for the desktop computer's parent path c:\Users\Joe that was created on June $2^{nd}$ at noon. Then the flowchart 200 terminates for each identified backup metadata object that is a backup metadata deletion object created at the specified backup time.

If a specified backup time backup time is not the earliest backup time of any backup data set created for a specified host, a system optionally determines whether the specified backup time is the most recent backup time of any backup data set created for the specified host, block 212. For example, the backup/restore application 118 determines whether the backup time of June $2^{nd}$ at noon is the most recent backup time of any backup data set created for the desktop computer 104. If the specified backup time is the most recent backup time of any backup data set created for the specified host, the flowchart 200 continues to block 214 to determine if an identified backup metadata object was created at a time that is the specified backup time or is later than the specified backup time. If the specified backup time is not the most recent backup time of any backup data set created for the specified host, the flowchart 200 proceeds to block 218 to identify the specified host's backup time that immediately precedes the specified backup time, and identify the specified host's backup time that immediately follows the specified backup time.

If a specified backup time is the most recent backup time of any backup data set created for a specified host, a system optionally determines whether an identified backup metadata object was created at a time that is the specified backup time or is later than the specified backup time, block 214. For example, the backup/restore application 118 identifies all backup metadata objects for the desktop computer's parent path c:\Users\Joe that were created after noon on June $2^{nd}$. If an identified backup metadata object was created at a time that is the specified backup time or is later than the specified backup time, the flowchart 200 continues to block 216 to delete the identified backup metadata object. If an identified backup metadata object was not created at a time that is the specified backup time or is later than the specified backup time, the flowchart 200 terminates for each identified backup metadata object that was not created at a time that is the specified backup time or is later than the specified backup time.

If an identified backup metadata object was created at a time that is the specified backup time or is later than the specified backup time, a system optionally deletes the identified backup metadata object, block 216. For example, the backup/restore application 118 deletes all backup metadata objects for the desktop computer's parent path c:\Users\Joe that were created after noon on June $2^{nd}$. Then the flowchart 200 terminates for each identified backup metadata object that was created at a time that is the specified backup time or is later than the specified backup time.

If a specified backup time is not the most recent backup time of any backup data set created for a specified host, a system optionally identifies the specified host's immediately preceding backup time and the specified host's immediately following backup time, block 218. For example, the backup/restore application 118 identifies that the immediately preceding backup data set that was created for the desktop computer 104 prior to noon on June $2^{nd}$ was created at noon on June $1^{st}$, and the immediately following backup data set that was created for the desktop computer 104 after noon on June $2^{nd}$ was created at noon on June $3^{rd}$.

After identifying a specified host's immediately preceding backup time and the specified host's immediately following backup time, a system optionally determines whether an identified backup metadata object is a backup metadata deletion object that was created at a time that is later than the specified backup time and that is the specified host's immediately following backup time or earlier than the specified host's immediately following backup time, block 220. For example, the backup/restore application 118 determines whether the backup metadata objects for the desktop computer's parent path c:\Users\Joe that are backup metadata deletion objects were created after noon on June $2^{nd}$ but before or by noon on June $3^{rd}$. If an identified backup metadata object is a backup metadata deletion object that was created at a time that is later than a specified backup time and that is the specified host's immediately following backup time or is earlier than the specified host's immediately following backup time, the flowchart 200 continues to block 222 to determine whether an identified backup metadata object includes directory deletion metadata. If an identified backup metadata object is not a backup metadata deletion object that was created at a time that is later than a specified backup time and that is the specified host's immediately following backup time or is earlier than the specified host's immediately following backup time, the flowchart 200 terminates for each identified backup metadata object that is not a backup metadata deletion object that was created at a time that is later than the specified backup time and that is the specified host's immediately following backup time or is earlier than the specified host's immediately following backup time.

If an identified backup metadata object is a backup metadata deletion object that was created at a time that is later than a specified backup time and that is the specified host's immediately following backup time or is earlier than the specified host's immediately following backup time, a system optionally determines whether the identified backup metadata object includes directory deletion metadata, block 222. For example, the backup/restore application 118 determines whether backup metadata objects for the desktop computer's parent path c:\Users\Joe include directory deletion metadata. If an identified backup metadata object that was created between specified times does not include directory deletion metadata, the flowchart 200 continues to block 224 to delete a backup metadata object associated with the identified backup metadata object and a creation time that is later than the specified host's immediately preceding backup time and that is the specified backup time or is earlier than the specified backup time. If an identified backup metadata object that was created between specified times includes directory deletion metadata, the flowchart 200 proceeds to block 226 to delete backup metadata children objects associated with the identified backup metadata object and that were created at a time that is later than the host's immediately preceding backup time and that is the specified backup time or is earlier than the specified backup time.

If an identified backup metadata object that was created between specified times does not include directory deletion metadata, a system optionally deletes all backup metadata objects associated with the backup metadata object and a creation time that is later than the specified host's immediately preceding backup time and that is the specified backup time or is earlier than the specified backup time, block 224. For example, the backup/restore application 118 deletes all backup metadata objects that were created after noon on June $1^{st}$ but before or by noon on June $2^{nd}$, and that are identified as deleted by the backup metadata deletion object for the desktop computer's parent path c:\Users\Joe. Then the flowchart 200 terminates for each backup metadata object associated with the backup metadata object and a creation time that is later than the specified host's immediately preceding backup time and that is the specified backup time or is earlier than the specified backup time.

If an identified backup metadata object that was created between specified times includes directory deletion metadata, a system optionally deletes backup metadata children objects associated with the identified backup metadata object and that were created at a time that is later than a host's immediately preceding backup time and that is the specified backup time or is earlier than the specified backup time, block 226. For example, the backup/restore application 118 deletes all backup metadata objects for the desktop computer's parent path c:\Users\Joe that were created after noon on June $1^{st}$ but before or by noon on June $2^{nd}$, and that are children of a backup metadata object for the desktop computer's parent path c:\Users\Joe that was created at noon on June $2^{nd}$ and that includes directory deletion metadata. Then the flowchart 200 terminates for each backup metadata children object associated with the identified backup metadata object and that was created at a time that is later than the specified host's immediately preceding backup time and that is the specified backup time or is earlier than the specified backup time.

Although FIG. 2 depicts the blocks 202-226 occurring in a specific order, the blocks 202-226 may occur in another order. In other implementations, each of the blocks 202-226 may also be executed in combination with other blocks and/or some blocks may be divided into a different set of blocks.

Figure 3:
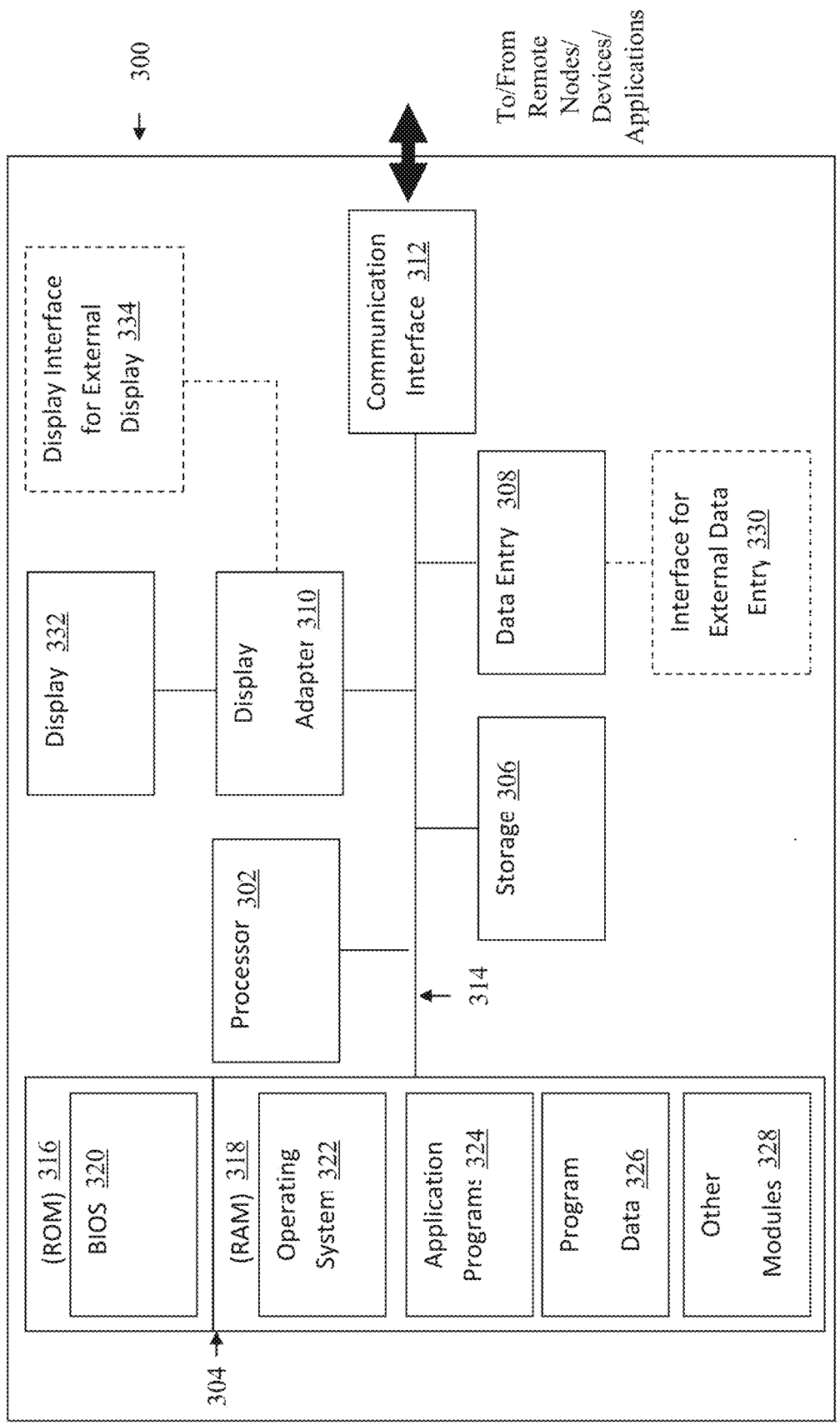
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for backup metadata deletion based on backup data deletion, the system comprising:
a processor-based application, which when executed on a computer, will cause the processor to:
create backup data sets by backing up data of a host;
create backup metadata objects by backing up metadata of the host, the backup metadata objects including a set of incremental backup metadata objects, each incremental backup metadata being a backup file storing changes to the metadata of the host, and a backup metadata deletion object identifying at least one of data of the host or metadata of the host that has been deleted since the last time that a backup metadata object was created;
receive a request to delete a backup data set, the request specifying the host, a path, and a backup time associated with the backup data set;
identify a backup metadata object associated with the host and the path specified in the request, from the backup metadata objects;
determine whether the backup time specified in the request is an earliest backup time of any of the backup data sets associated with the host specified in the request;
in response to a determination that the backup time is the earliest backup time:
determine whether the identified backup metadata object is the backup metadata deletion object included in the backup metadata objects, and
determine whether the backup metadata deletion object was created at the backup time specified in the request; and
delete the backup metadata object in response to a determination that the backup metadata object is the backup metadata deletion object and was created at the backup time.

2. The system of claim 1, wherein the processor-based application further causes the processor to:
determine whether the backup time is a most recent backup time associated with any of the backup data sets associated with the host in response to a determination that the backup time is not the earliest backup time;
determine whether the identified backup metadata object is associated with a time that is one of the backup time and later than the backup time in response to a determination that the backup time is the most recent backup time; and
delete the backup metadata object in response to a determination that the backup metadata object is associated with the time that is one of the backup time and later than the backup time.

3. The system of claim 2, wherein the processor-based application further causes the processor to:
identify, for the host, a backup time immediately preceding the backup time and a backup time immediately following the backup time, in response to a determination that the backup time is not the most recent backup time;
determine whether the backup metadata object is any backup metadata deletion object associated with a time that is later than the backup time and is one of the immediately following backup time and earlier than the immediately following backup time;
determine whether the backup metadata object comprises directory deletion metadata in response to a determination that the backup metadata object is any backup metadata deletion object associated with the time that is later than the backup time and is one of the immediately following backup time and earlier than the immediately following backup time; and
delete any backup metadata children objects that are associated with the backup metadata object and a time later than the immediately preceding backup time and that is one of the backup time and earlier than the backup time in response to a determination that the backup metadata object comprises directory deletion metadata.

4. The system of claim 3, wherein the processor-based application further causes the processor to:
determine whether the backup metadata object is associated with the backup time in response to the determination that the backup metadata object comprises directory deletion metadata; and
delete the backup metadata object in response to a determination that the backup metadata object is associated with the backup time.

5. The system of claim 3, wherein the processor-based application further causes the processor to delete any backup metadata objects associated with the backup metadata object and a time that is later than the immediately preceding backup time and one of the backup time and earlier than the backup time in response to a determination that the backup metadata object does not comprise directory deletion metadata.

6. The system of claim 1, wherein identifying the backup metadata object associated with the host and the path comprises identifying a parent path associated with the path.

7. The system of claim 1, wherein deleting the backup metadata object comprises marking the backup data set as deleted, deleting the backup metadata object, and deleting the marked backup data set.

8. A computer-implemented method for backup metadata deletion based on backup data deletion, the method comprising:
creating backup data sets by backing up data of a host;
creating backup metadata objects by backing up metadata of the host, the backup metadata objects including a set of incremental backup metadata objects, each incremental backup metadata being a backup file storing changes to the metadata of the host, and a backup metadata deletion object identifying at least one of data of the host or metadata of the host that has been deleted since the last time that a backup metadata object was created;

receiving a request to delete a backup data set, the request specifying the host, a path, and a backup time associated with the backup data set;

identifying a backup metadata object associated with the host and the path specified in the request, from the backup metadata objects;

determining whether the backup time specified in the request is an earliest backup time of any of the backup data sets associated with the host specified in the request;

in response to a determination that the backup time is the earliest backup time:
  determining whether the identified backup metadata object is the backup metadata deletion object included in the backup metadata objects, and
  determining whether the backup metadata deletion object was created at the backup time specified in the request; and deleting the backup metadata object in response to a determination that the backup metadata object is the backup metadata deletion object and was created at the backup time.

9. The method of claim 8, wherein the method further comprises:
  determining whether the backup time is a most recent backup time associated with any of the backup data sets associated with the host in response to a determination that the backup time is not the earliest backup time;
  determining whether the identified backup metadata object is associated with a time that is one of the backup time and later than the backup time, in response to a determination that the backup time is the most recent backup time; and
  delete the backup metadata object in response to a determination that the backup metadata object is associated with the time that is one of the backup time and later than the backup time.

10. The method of claim 9, wherein the method further comprises:
  identifying, for the host, a backup time immediately preceding the backup time and a backup time immediately following the backup time, in response to a determination that the backup time is not the most recent backup time;
  determining whether the backup metadata object is any backup metadata deletion object associated with a time that is later than the backup time and is one of the immediately following backup time and earlier than the immediately following backup time;
  determining whether the backup metadata object comprises directory deletion metadata, in response to a determination that the backup metadata object is any backup metadata deletion object associated with the time that is later than the backup time and is one of the immediately following backup time and earlier than the immediately following backup time; and
  deleting any backup metadata children objects associated with the backup metadata object and a time that is later than the immediately preceding backup time and that is one of the backup time and earlier than the backup time, in response to a determination that the backup metadata object comprises directory deletion metadata.

11. The method of claim 10, wherein the method further comprises determining whether the backup metadata object is associated with the backup time, in response to the determination that the backup metadata object comprises directory deletion metadata; and deleting the backup metadata object in response to the determination that the backup metadata object is associated with the backup time.

12. The method of claim 10, wherein the method further comprises deleting any backup metadata objects associated with the backup metadata object and a time that is later than the immediately preceding backup time and that is one of the backup time and earlier than the backup time, in response to a determination that the backup metadata object does not comprise directory deletion metadata.

13. The method of claim 8, wherein identifying the backup metadata object associated with the host and the path comprises identifying a parent path associated with the path.

14. The method of claim 8, wherein deleting the backup metadata object comprises marking the backup data set as deleted, deleting the backup metadata object, and deleting the marked backup data set.

15. A computer program product, comprising a non-transitory computer-readable medium having a computer-readable program code embodied therein to be executed by one or more processors, the program code including instructions to:
  create backup data sets by backing up data of a host;
  create backup metadata objects by backing up metadata of the host, the backup metadata objects including a set of incremental backup metadata objects, each incremental backup metadata being a backup file storing changes to the metadata of the host, and a backup metadata deletion object identifying at least one of data of the host or metadata of the host that has been deleted since the last time that a backup metadata object was created;
  receive a request to delete a backup data set, the request specifying the host, a path, and a backup time associated with the backup data set;
  identify a backup metadata object associated with the host and the path specified in the request, from the backup metadata objects;
  determine whether the backup time specified in the request is an earliest backup time of any of the backup data sets associated with the host specified in the request;
  in response to a determination that the backup time is the earliest backup time:
    determine whether the identified backup metadata object is the backup metadata deletion object included in the backup metadata objects, and
    determine whether the backup metadata deletion object was created at the backup time specified in the request; and
  delete the backup metadata object in response to a determination that the backup metadata object is the backup metadata deletion object and was created at the backup time.

16. The computer program product of claim 15, wherein the program code includes further instructions to:
  determine whether the backup time is a most recent backup time associated with any of the backup data sets associated with the host in response to a determination that the backup time is not the earliest backup time;
  determine whether the identified backup metadata object is associated with a time that is one of the backup time and later than the backup time, in response to a determination that the backup time is the most recent backup time; and
  delete the backup metadata object in response to a determination that the backup metadata object is associated with the time that is one of the backup time and later than the backup time.

17. The computer program product of claim 16, wherein the program code includes further instructions to:
- identify, for the host, a backup time immediately preceding the backup time and a backup time immediately following the backup time, in response to a determination that the backup time is not the most recent backup time;
- determine whether the backup metadata object is any backup metadata deletion object associated with a time that is later than the backup time and is one of the immediately following backup time and earlier than the immediately following backup time;
- determine whether the backup metadata object comprises directory deletion metadata, in response to a determination that the backup metadata object is any backup metadata deletion object associated with the time that is later than the backup time and is one of the immediately following backup time and earlier than the immediately following backup time;
- delete any backup metadata children objects associated with the backup metadata object and a time that is later than the immediately preceding backup time and that is one of the backup time and earlier than the backup time, in response to a determination that the backup metadata object comprises directory deletion metadata;
- determine whether the backup metadata object is associated with the backup time, in response to the determination that the backup metadata object comprises directory deletion metadata; and
- delete the backup metadata object in response to the determination that the backup metadata object is associated with the backup time.

18. The computer program product of claim 17, wherein the program code includes further instructions to delete any backup metadata objects associated with the backup metadata object and a time that is later than the immediately preceding backup time and that is one of the backup time and earlier than the backup time, in response to a determination that the backup metadata object does not comprise directory deletion metadata.

19. The computer program product of claim 15, wherein identifying the backup metadata object associated with the host and the path comprises identifying a parent path associated with the path.

20. The computer program product of claim 15, wherein deleting the backup metadata object comprises marking the backup data set as deleted, deleting the backup metadata object, and deleting the marked backup data set.

* * * * *